United States Patent
Berkcan et al.

(10) Patent No.: US 8,364,427 B2
(45) Date of Patent: Jan. 29, 2013

(54) FLOW SENSOR ASSEMBLIES

(75) Inventors: Ertugrul Berkcan, Clifton Park, NY (US); Shankar Chandrasekaran, Chennai (IN); Bo Li, Rexford, NY (US); Stanton Earl Weaver, Jr., Northville, NY (US)

(73) Assignee: General Electric Company, Niskayuna, NY (US)

( * ) Notice: Subject to any disclaimer, the term of this patent is extended or adjusted under 35 U.S.C. 154(b) by 387 days.

(21) Appl. No.: 12/683,474

(22) Filed: Jan. 7, 2010

(65) Prior Publication Data

US 2011/0166800 A1    Jul. 7, 2011

(51) Int. Cl.
*G01F 1/00* (2006.01)

(52) U.S. Cl. ........................... 702/45; 73/1.16

(58) Field of Classification Search .......... 702/33, 702/45, 50, 55; 73/1.16, 19.04, 23.24, 54.07, 73/54.13

See application file for complete search history.

(56) References Cited

U.S. PATENT DOCUMENTS

| | | | |
|---|---|---|---|
| 4,550,614 A | 11/1985 | Herzl | |
| 4,729,243 A | 3/1988 | Friedland et al. | |
| 4,841,780 A * | 6/1989 | Inada et al. | 73/861.06 |
| 6,631,638 B2 | 10/2003 | James et al. | |
| 7,424,366 B2 | 9/2008 | Angelescu et al. | |
| 2004/0237645 A1 | 12/2004 | Naguib et al. | |
| 2005/0022593 A1 | 2/2005 | Franz et al. | |
| 2006/0005636 A1 | 1/2006 | Friedrich | |
| 2007/0061093 A1 | 3/2007 | Angelescu et al. | |
| 2008/0015440 A1 | 1/2008 | Shandas et al. | |
| 2008/0105046 A1 | 5/2008 | Ricks | |
| 2009/0158838 A1 | 6/2009 | Speldrich | |

FOREIGN PATENT DOCUMENTS

| | | |
|---|---|---|
| EP | 0272758 | 7/1992 |
| EP | 0415129 | 4/1997 |
| EP | 0668711 | 9/2002 |
| EP | 0815415 | 12/2002 |
| JP | 431716 | 3/1992 |
| WO | 9714936 | 4/1997 |
| WO | 0039537 | 7/2000 |
| WO | 2008053193 | 5/2008 |

OTHER PUBLICATIONS

JP4031716 Abstract, Feb. 3, 1992.
R. Ma et al., "A MEMS-Based Flow Rate and Flow Direction Sensing Platform with Integrated Temperature Compensation Scheme," Sensors, ISSN 1424-8220, vol. 9, Jul. 9, 2009.

* cited by examiner

*Primary Examiner* — Sujoy Kundu
(74) *Attorney, Agent, or Firm* — Penny A. Clarke

(57) ABSTRACT

A flow sensor assembly is provided and includes a flow conduit configured to impart a disturbance to a flow, multiple sensors disposed at respective sensing locations along the flow conduit. Each sensor is responsive to the disturbance of the flow and generates a corresponding response signal. The flow sensor assembly further includes a processor operably connected to each sensor, the processor being configured to compute a cross-correlation function between the response signals generated by said sensors, and determine a flow rate and a direction for the flow through the conduit based on the computed cross-correlation function. Additional flow sensor assembly arrangements are also disclosed.

22 Claims, 6 Drawing Sheets

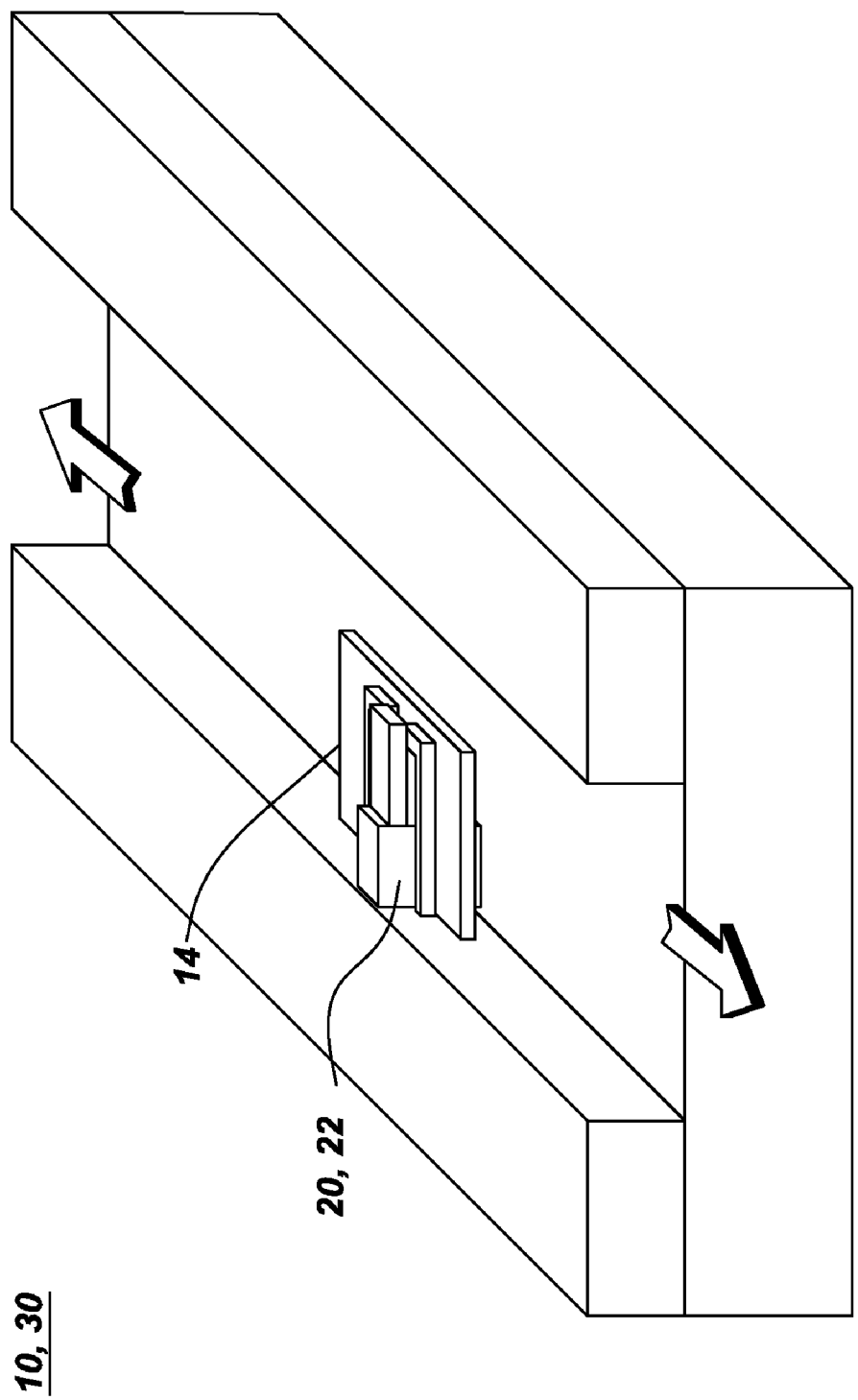

FLOW SENSOR ASSEMBLIES

BACKGROUND

The invention relates generally to flow sensor assemblies for determining the flow rate of a flow through a conduit and, more particularly, to correlated flow sensor assemblies for determining flow rates.

Sleep apnea is a condition that affects millions of people and, if undiagnosed and untreated, may cause serious health complications. Accordingly, accurate and reliable sleep apnea monitors are needed. A number of different sensing techniques are employed to monitor air path flow. Known sleep apnea monitoring systems comprise a variety of flow and/or pressure sensors. These sensors may include anemometers, as well as ultrasonic, differential-pressure or thermistor flow sensors. The flow and/or pressure sensors can be placed in the flow conduit, in the patient/monitoring system interface (for example, in a mask fitted on the patient's nose) or in the control electronics box.

Monitoring air path flow for sleep apnea applications presents a number of challenges, including providing sufficient sensitivity over a large dynamic range, as the air flow may vary in a range of about 0-200 liters per minute. However, existing flow sensor assemblies may be sensitive to noise parameters, such as temperature, moisture and density fluctuations. In addition, air flows in both directions through the flow conduit, which further complicates the measurements.

It would therefore be desirable to provide flow sensor assemblies that can operate under large moisture fluctuations and that exhibit the desired sensitivity (typically a fraction of a liter per minute) over a large dynamic range of air flow rates (for example, over a range of about 0-200 liters per minute). It would further be desirable for gain stability and sensor noise to have no effect on the measured flow rates.

BRIEF DESCRIPTION

One aspect of the present invention resides in a flow sensor assembly comprising a flow conduit configured to impart a disturbance to a flow. The assembly further includes a number of sensors disposed at respective sensing locations along the flow conduit. Each sensor is responsive to the disturbance of the flow and generates a corresponding response signal. The flow sensor assembly further includes a processor operably connected to each sensor. The processor is configured to compute a cross-correlation function between the response signals generated by the sensors and determine a flow rate and the direction for the flow through the conduit based on the computed cross-correlation function.

Another aspect of the present invention resides in a flow sensor assembly comprising a flow conduit configured to guide a flow. The assembly further includes at least one actuator disposed at a respective actuating location along the flow conduit. The actuator(s) is (are) configured to impart a disturbance to the flow within the flow conduit. The assembly further includes a number of sensors disposed at respective sensing locations along the flow conduit. Each sensor is responsive to the disturbance of the flow and generates a corresponding response signal. The assembly includes a processor operably connected to each sensor. The processor is configured to compute a cross-correlation function between the response signals generated by the sensors, and determine a flow rate and the direction for the flow through the conduit based on the computed cross-correlation function. The actuator(s) is (are) not operably connected to the processor.

Yet another aspect of the present invention resides in a flow sensor assembly comprising a flow conduit configured to guide a flow. The assembly further includes at least one actuator disposed at a respective actuating location along the flow conduit. The at least one actuator is configured to impart a disturbance to the flow within the flow conduit. The assembly further includes a sensor disposed at a sensing location along the flow conduit, wherein the sensor is responsive to the disturbance of the flow and generates one or more response signals. The assembly further includes a processor operably connected to the sensor. The processor is configured to compute a modification of a frequency $f_s$, which is associated with a respective one of the one or more response signals, with respect to a reference frequency $f_{ref}$ and to determine a flow rate for the flow through the flow conduit based on a functional form of the computed modification of the frequency $f_s$.

Another aspect of the present invention resides in a flow sensor assembly comprising a flow conduit configured to impart a disturbance to a flow. The assembly further includes a sensor disposed at a sensing location along the flow conduit, wherein the sensor is responsive to the disturbance of the flow and generates one or more response signals. The assembly further includes a processor operably connected to the sensor. The processor is configured to compute a modification of a frequency $f_s$, which is associated with a respective one of the one or more response signals, with respect to a reference frequency $f_{ref}$ and determine a flow rate for the flow through the flow conduit based on a functional form of the computed modification of the frequency $f_s$.

DRAWINGS

These and other features, aspects, and advantages of the present invention will become better understood when the following detailed description is read with reference to the accompanying drawings in which like characters represent like parts throughout the drawings, wherein:

FIG. 1 schematically depicts a flow sensor assembly embodiment of the invention;

Figure 1:
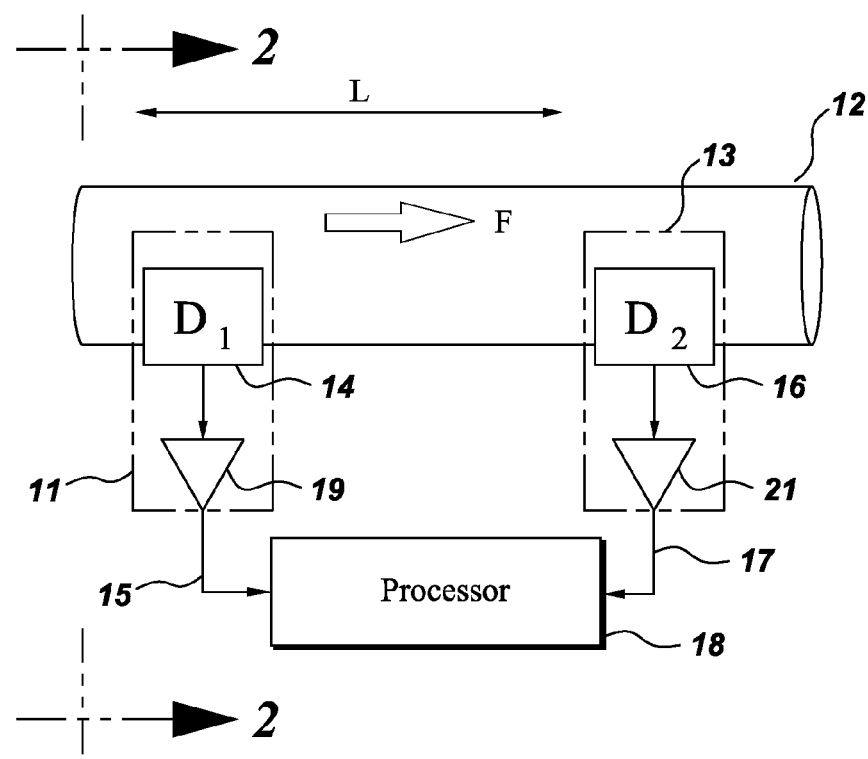
Figure 4:
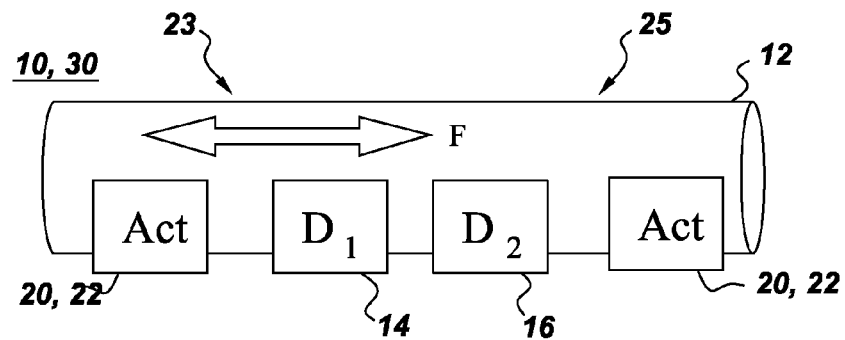
Figure 5:
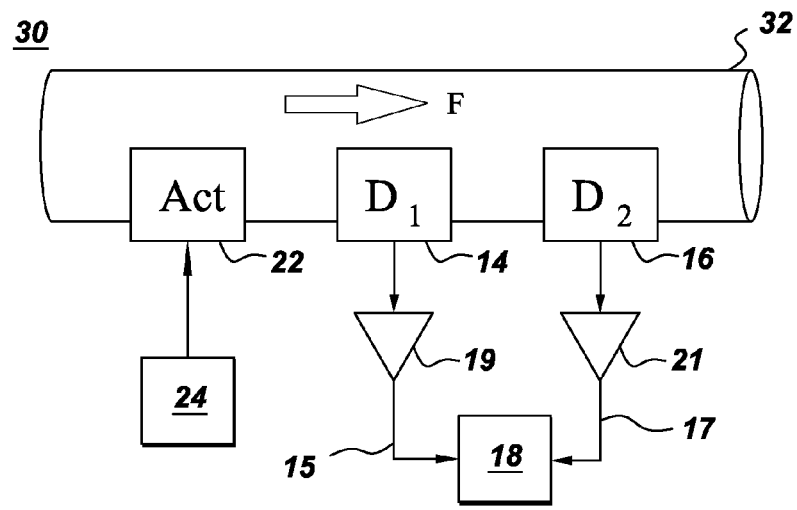
Figure 6:
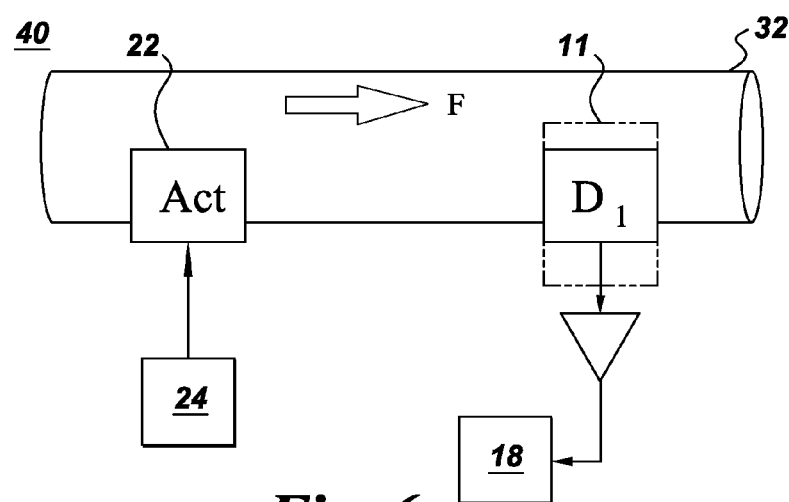
Figure 7:
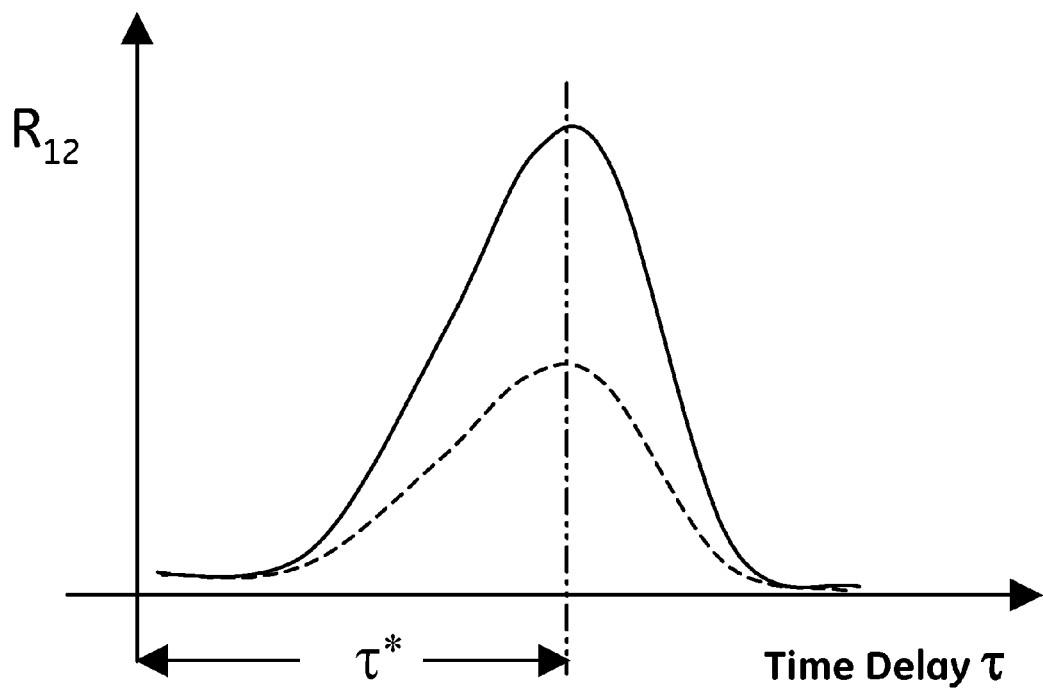
Figure 8:
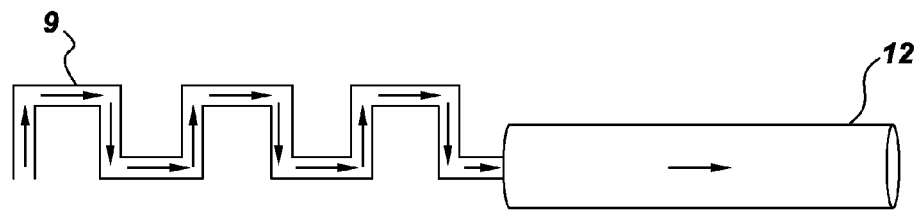
Figure 9:
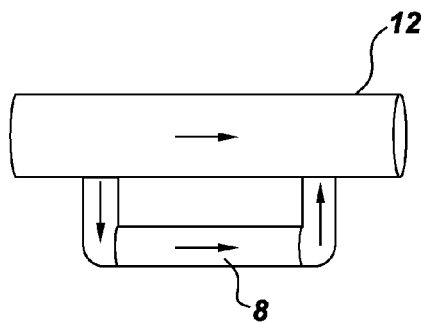
Figure 10:
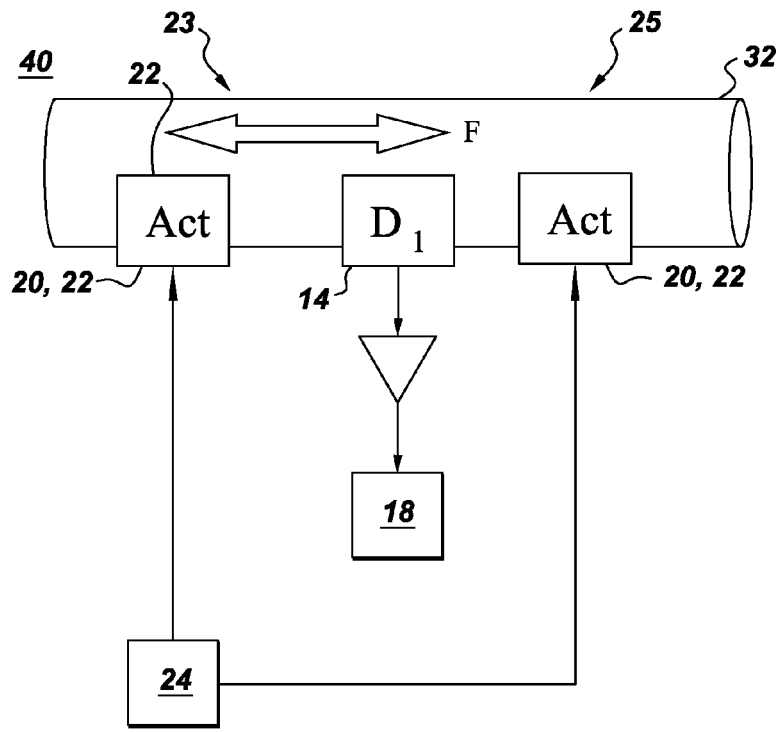
Figure 11:
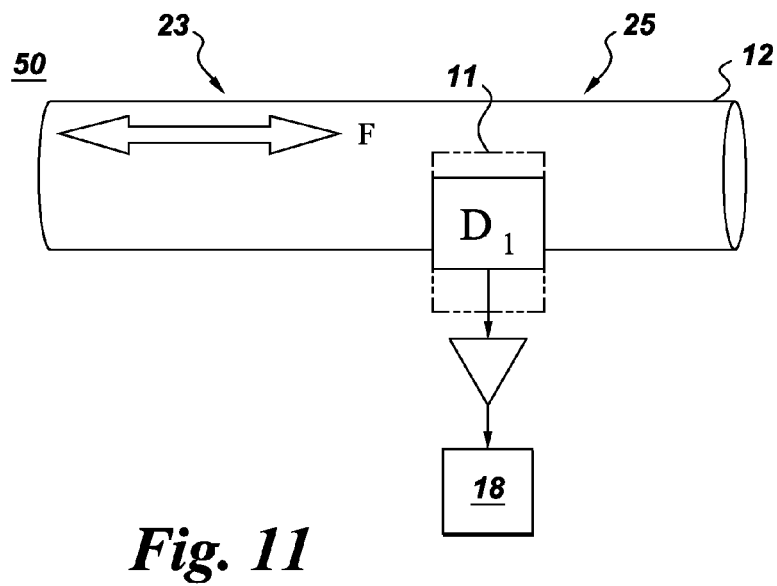

FIG. 4 schematically depicts a dual directional flow sensing arrangement for the flow sensor assemblies of FIGS. 1 and 5;

FIG. 5 schematically depicts another flow sensor assembly embodiment of the invention;

FIG. 6 illustrates another example flow sensor assembly with open loop, active actuation;

FIG. 7 is a plot of the cross-correlation function $R_{12}$ as a function of the time delay $\tau$ between the sensors;

FIG. 8 illustrates an example modified flow conduit;

FIG. 9 shows an example flow conduit configuration with a bypass portion;

FIG. 10 schematically depicts a dual directional flow sensing arrangement for the flow sensor assembly of FIG. 6;

FIG. 11 illustrates another example flow sensor assembly configuration; and

FIG. 12 illustrates another example flow sensor assembly.

DETAILED DESCRIPTION

Figure 2:
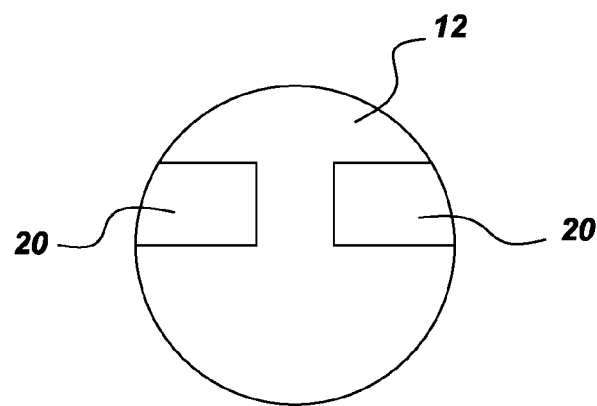
FIG. 2 illustrates an example flow conduit with passive actuation.

A flow sensor assembly 10 embodiment of the invention is described with reference to FIGS. 1, 2 and 4. As indicated in FIG. 1, the flow sensor assembly 10 includes a flow conduit 12 configured to impart a disturbance to a flow (designated by "F" in FIG. 1). For example, the flow conduit may impart turbulence to the flow F to generate a turbulent form. Other forms of flow disturbances may also be imparted, non-limiting examples of which include a protrusion partially in or completely through the conduit. The protrusion could take on many shapes, for example cylindrical, square, rectangular and be varied in size and/or perforated depending on the desired flow rate and/or range being measured. In addition, the shape of the conduit itself through restriction or change in shape (FIG. 8, for example) may provide the disturbance. The flow sensor assembly 10 further includes multiple sensors 14, 16 disposed at respective sensing locations 11, 13 along the flow conduit 12. Each of the sensors 14, 16 is responsive to the disturbance of the flow and generates a corresponding response signal 15, 17. For the illustrated example, signal conditioners 19, 21 are provided to condition the response signals generated by the sensors 14, 16. The signal conditioners may, for example, include one or more of amplifiers, filters, and analog-to-digital (A/D) converters. The signal conditioning electronics may be separated from or co-located with the processor 18.

The flow sensor assembly 10 further includes processor 18 operably connected to each of the sensors 14, 16. For the arrangement shown in FIG. 1, the processor 18 is configured to compute a cross-correlation function between the response signals 15, 17 generated by the sensors 14, 16, and determine the flow rate and the direction for the flow F through the conduit 12 based on the computed cross-correlation function. It should be noted that the present invention is not limited to any particular processor for performing the processing tasks of the invention. The term "processor," as that term is used herein, is intended to denote any machine capable of performing the calculations, or computations, necessary to perform the tasks of the invention, and to control the mechanical and electrical devices in the invention. The term "processor" is intended to denote any machine that is capable of accepting a structured input and/or of processing the input in accordance with prescribed rules to produce an output, as will be understood by those skilled in the art.

In one non-limiting example, the cross-correlation function between the response signals and the flow rate for the flow through the flow conduit 12 is calculated as follows.

$$R_{12}(\tau) = \frac{1}{T}\int_0^T s_1(t-\tau)s_2(t)dt \quad \text{(Eq. 1)}$$

where $R_{12}$ is the correlation function for the response signals $s_1(t)$ and $s_2(t)$ for the two sensors D1 (14) and D2 (16), t is time, and $\tau$ is the time delay between the sensing of the disturbance by sensor D1 and the subsequent sensing of the disturbance by sensor D2. The flow rate u can then be calculated as follows.

$$u = L/\tau^* \quad \text{(Eq. 2)}$$

where L is the distance between the sensors (see FIG. 1), and $\tau^*$ is the time at which the cross-correlation function $R_{12}$ has a maximum value. In addition, the direction of the flow may be determined from the sign of the cross-correlation function.

FIG. 7 is a plot of the cross-correlation function $R_{12}$ as a function of the time delay $\tau$ between the sensors D1 and D2. The solid line indicates an example cross-correlation function $R_{12}$ with a maximum value at time $\tau^*$. The dashed line represents the cross-correlation function $R_{12}$, where the gain of the sensors D1 and/or D2 is reduced. Notably, both cross-correlation functions $R_{12}$ have a maximum value at time $\tau^*$, such that gain stability will not affect the computed flow rate. In addition, the cross-correlation function $R_{12}$ is not sensitive to noise components of either of the response signals $s_1(t)$ and $s_2(t)$.

The desired spacing between the sensing locations 11, 13 may be determined numerically and/or experimentally. For particular embodiments of the invention, neighboring ones of the sensing locations 11, 13 are separated by a distance less than the correlation length of the disturbance of the flow.

For the general case, a disturbance may be imparted passively or actively to the flow F through the flow conduit 12. However, for the arrangement shown in FIG. 1, the disturbance is imparted passively, and this may be achieved in several ways. For example, the flow conduit 12 may comprise a modified flow conduit 12, as indicated for example in FIG. 8. For the example arrangement shown in FIG. 8, the modified flow conduit 12 comprises a serpentine portion 9. However, it should be noted that this serpentine arrangement is merely an illustrative example, and a variety of modified flow conduit configurations may be employed, provided they impart a disturbance to the flow. Other non-limiting examples of a modified flow conduit include a loop, a corkscrew, a constriction or an expansion or a repeated series of any of the mentioned modifications.

For certain arrangements, the flow conduit 12 comprises one or more passive actuators 20 for imparting the disturbance to the flow. FIG. 2 is a cross-sectional view of a flow conduit 12 having passive actuators 20 that comprise protrusions 20 extending into the flow conduit 12. Although two protrusions 20 are shown, this is merely illustrative, and the number, location and arrangement of the protrusion(s) may vary depending on the application. Other examples of passive actuations include blunt objects extending into the flow conduit, fixed apertures, and mesh gratings.

FIG. 4 schematically depicts a dual directional flow sensing arrangement for the flow sensor assembly of FIG. 1. For the illustrated example, the flow conduit 12 includes a number of passive actuators 20. For the arrangement shown in FIG. 4, one of the passive actuators 20 is disposed on a first side 23 of the sensors 14, 16, and one of the passive actuators 20 is disposed on a second side 25 of the sensors, such that the actuators and sensors are arranged in a symmetric configuration to provide for bidirectional flow sensing. The sensors 14, 16 are configured to generate response signals in response to the disturbance in the flow from the first side 23, and the sensors 14, 16 are further configured to generate response signals in response to the disturbance in the flow from the second side 25. In this manner, the flow sensor assembly 10 is equipped for dual directional flow sensing. This bidirectional flow sensing configuration is particularly desirable for sleep apnea monitoring and other applications involving monitoring breathing because flow moves in both directions for such applications.

In addition to the arrangement shown in FIG. 4, a dual directional sensing assembly can be achieved by arranging the flow conduit 12 and the sensors 14, 16 in a symmetric configuration. For example, a symmetric modified flow conduit and sensor configuration may be employed for bidirectional flow sensing.

Beneficially a variety of sensors 14, 16 can be used in the sensor assemblies of the present invention. For certain applications, the sensors 14, 16 comprise micro-electrical-mechanical systems (MEMS) sensors. Similarly, the actuators 20 may comprise MEMS actuators. Non-limiting examples of MEMS sensors include thermal sensors, pressure sensors, resonators, coriolis sensors and ultrasonic based sensors. Non-limiting examples of thermal sensors include thermopiles, infrared (IR) sensors and semiconductor devices, such as PN junctions. Non-limiting examples of pressure sensors include pressure-sensitive membranes, piezoresistors, piezoelectric devices, and capacitive sensors. One non-limiting example of a resonator is a MEMS-based cantilever.

Figure 3:
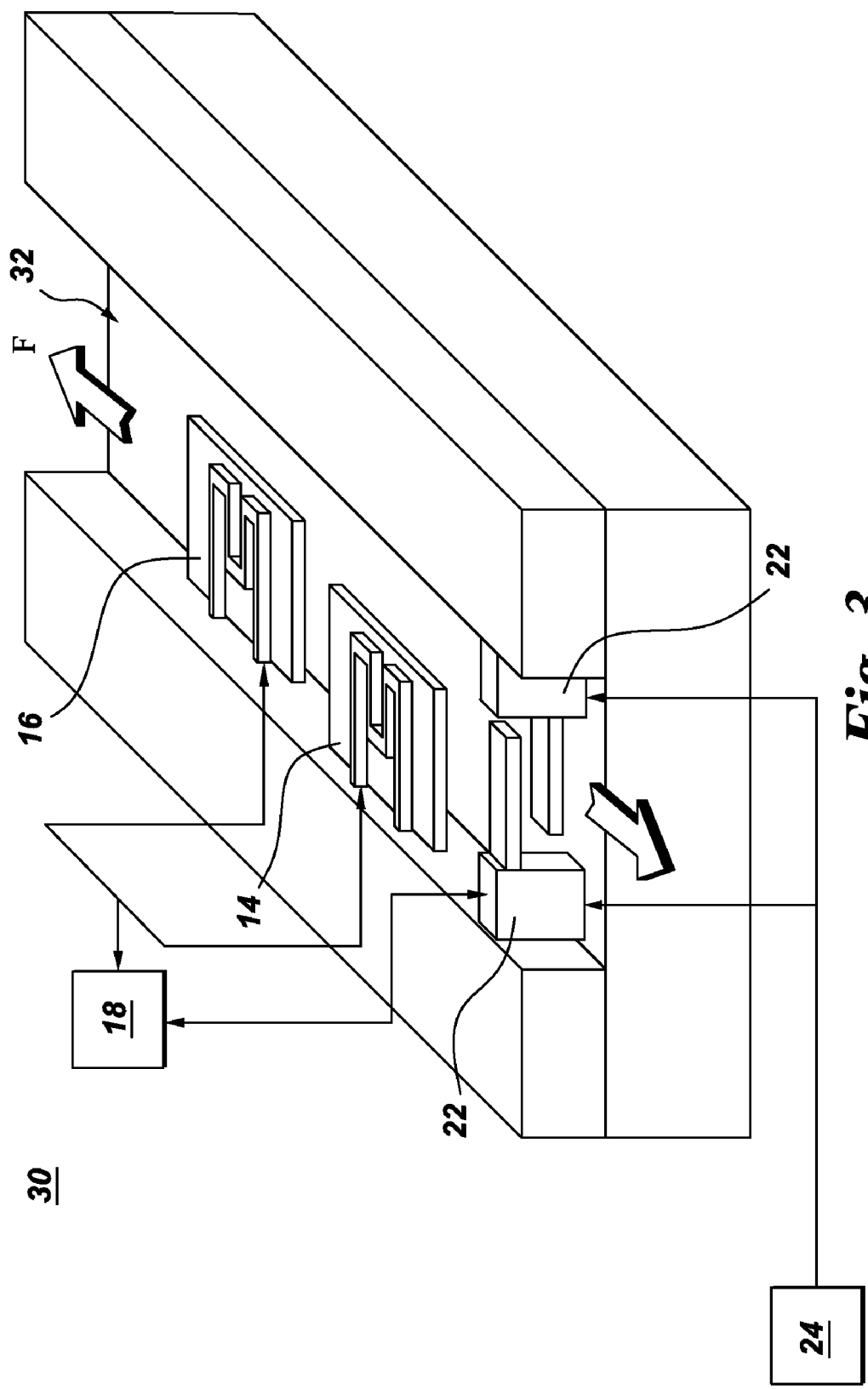
FIG. 3 illustrates an example flow sensor assembly with open loop, active actuation.

For certain arrangements, the sensors 14, 16 are formed in a single monolithic element, such as a multi-component MEMS devices on a single substrate, as shown for example in FIG. 3 In other configurations, at least one of the sensors 14, 16 and at least one of the passive actuators 20 are formed in a single, monolithic element, such as multi-component MEMS devices on a single substrate, as shown for example in FIG. 12. In other example arrangements, at least one of the sensors 14, 16 is further configured to impart the disturbance to the flow. For example, a membrane type of MEMS device may be employed.

For certain arrangements, the flow conduit 12 has a bypass portion 8. FIG. 9 depicts an example flow conduit 12 with bypass portion 8. Although not shown in FIG. 9, one or more of the sensors 14, 16 and/or one or more of the actuators 20 may be disposed within the bypass portion 8. Alternatively, the sensors and/or actuators may be disposed outside of bypass portion 8. For certain arrangements, a y-pass channel (not shown) is provided inside the main flow channel.

Another flow sensor assembly 30 embodiment of the invention is described with reference to FIGS. 3 and 5. As indicated in FIG. 5, the flow sensor assembly 30 includes a flow conduit 32 configured to guide a flow and at least one actuator 22 disposed at a respective actuating location along the flow conduit 32. The actuator(s) is (are) configured to impart a disturbance to the flow within the flow conduit. The flow sensor assembly 30 further includes a number of sensors 14, 16 disposed at respective sensing locations along the flow conduit 32. According to particular embodiments, neighboring sensing locations are separated by a distance, which is less than a correlation length of the turbulence of the flow. Each of the sensors is responsive to the disturbance of the flow and generates a corresponding response signal. The flow sensor assembly 30 further includes a processor 18 operably connected to each of the sensors. The processor 18 is configured to compute a cross-correlation function between the response signals generated by the sensors, and determine a flow rate for the flow through the conduit based on the computed cross-correlation function. As indicated in FIG. 5, the actuator(s) is (are) not operably connected to the processor 18.

Example calculations for the cross-correlation function $R_{12}(t)$ between the response signals $s_1(t)$ and $s_2(t)$ and for the flow rate u for the flow through the flow conduit 32 are described above with reference to Equations 1 and 2. As discussed above with reference to flow sensor assembly 10, FIG. 7 is a plot of the cross-correlation function $R_{12}$ as a function of the time delay τ between the sensors D1 and D2. The solid line indicates an example cross-correlation function $R_{12}$ with a maximum value at time τ*. The dashed line represents the cross-correlation function $R_{12}$, where the gain of the sensors D1 and/or D2 is reduced. Beneficially, gain stability will not affect the computed flow rate. In addition, the cross-correlation function $R_{12}$ is not sensitive to noise components of either of the response signals $s_1(t)$ and $s_2(t)$.

FIG. 3 illustrates an example flow sensor assembly with open loop, active actuation. Namely, for the arrangement shown in FIG. 3, the flow conduit 32 (only a portion of which is shown) comprises one or more active actuators 22, for imparting a disturbance to the flow F. For the illustrated arrangement, the flow sensor assembly 30 further includes at least one power supply 24, for supplying power to the active actuators 22. For the illustrated example, the active actuators are cantilevers. Other non-limiting examples of active actuators 22 include a moving beam, plank or girder. For the illustrated arrangement, the flow sensor assembly 30 further includes at least one power supply 24 for supplying power to the active actuators 22. As indicated, the power supply 24 is not operably connected to the processor 18.

Similar to flow sensor assembly 10, flow sensor assembly 30 may also be configured for dual directional flow sensing, and this arrangement is shown in FIG. 4 as well. For the arrangement shown in FIG. 4, the flow sensor assembly 30 includes a number of active actuators 22. For the illustrated arrangement, one of the actuators 22 is disposed on a first side 23 of the sensors 14, 16, and one of the actuators 22 is disposed on a second side 25 of the sensors, such that the actuators and sensors are arranged in a symmetric configuration to provide for bidirectional flow sensing. The sensors 14, 16 are configured to generate response signals in response to the disturbance in the flow from the first side 23, and the sensors are further configured to generate response signals in response to the disturbance in the flow from the second side 25.

Example sensors 14, 16 include MEMS sensors. Similarly, the actuators 22 may comprise MEMS actuators. For certain configurations, the sensors 14, 16 are formed in a single monolithic element. In other configurations, at least one of the sensors 14, 16 and at least one of the actuators 22 are formed in a single, monolithic element, such as multi-component MEMS devices on a single substrate.

In addition, flow conduit 32 may include one or more bypass portions 8, similar to the arrangement discussed above with reference to FIG. 9. Although not shown in FIG. 9, one or more of the sensors 14, 16 and/or one or more of the actuators 22 may be disposed within the bypass portion 8. Alternatively, the sensors and/or actuators may be disposed outside of bypass portion 8.

Another flow sensor assembly 40 is shown in FIG. 6. As shown, the flow sensor assembly includes a flow conduit 32 configured to guide a flow and at least one actuator 20, 22 disposed at a respective actuating location along the flow conduit. The actuator(s) is(are) configured to impart a disturbance to the flow within the flow conduit 32. The flow sensor assembly 40 further includes a sensor 14 disposed at a sensing location 11 along the flow conduit. The sensor 14 is responsive to the disturbance of the flow and generates one or more response signals. Example sensors and actuators include MEMS sensors and MEMS actuators.

As indicated in FIG. 6, the flow sensor assembly 40 further includes a processor 18 operably connected to the sensor. The processor 18 is configured to compute a modification of a frequency $f_s$, which is associated with a respective one of the one or more response signals, with respect to a reference frequency $f_{ref}$. The processor 18 is further configured to determine a flow rate for the flow through the flow conduit 32 based on a functional form of the computed modification of the frequency $f_s$. For the example arrangement shown in FIG. 6, the actuator(s) is (are) not operably connected to the processor 18.

In one non-limiting example, the flow rate u of the flow F through the conduit is determined in accordance with the following functional form of the computed modification of the frequency $f_s$:

$$(f_s - f_{ref})/f_{ref} \tag{Eq. 3}$$

In another non-limiting example, the flow rate u is determined in accordance with the following functional form of the computed modification of the frequency $f_s$:

$$f_s/f_{ref} \tag{Eq. 4}$$

For certain example arrangements, the reference frequency $f_{ref}$ corresponds to the frequency $f_A$ associated with the actuator 20, 22.

For other example arrangements, the frequency $f_s$ is computed over time based on a number of response signals {s}. The flow rate u of the flow F through the conduit can then be determined from a modification of the frequency, such as illustrated in Equations 3 and 4.

Similar to flow sensor assemblies 10, 30, flow sensor assembly 40 may also be configured for dual directional flow sensing, and this arrangement is shown in FIG. 10. For the arrangement shown in FIG. 10, the flow sensor assembly 40 includes a number of actuators 20, 22. For the illustrated arrangement, one of the actuators is disposed on a first side 23 of the sensor 14, and another one of the actuators is disposed on a second side 25 of the sensor, such that the actuators and sensor are arranged in a symmetric configuration to provide for bidirectional flow sensing. The sensor 14 is configured to generate response signals in response to the disturbance in the flow from the first side 25, and the sensor is further configured to generate response signals in response to the disturbance in the flow from the second side 25.

The flow conduit 32 may include a bypass portion 8, similar to the arrangement described above with reference to FIG. 9.

Another flow sensor assembly 50 is shown in FIG. 11. As indicated in FIG. 11, the flow sensor assembly 50 includes a flow conduit 12 configured to impart a disturbance to a flow, and a sensor 14 disposed at a sensing location 11 along the flow conduit 12. The sensor 14 is responsive to the disturbance of the flow and generates one or more response signals. Example sensors include MEMS sensors. The flow sensor assembly 50 further includes a processor 18 operably connected to the sensor and configured to compute a modification of the frequency $f_s$, which is associated with a respective one of the one or more response signals, with respect to a reference frequency $f_{ref}$. The processor 18 is further configured to determine a flow rate for the flow through the flow conduit based on a functional form of the computed modification of the frequency $f_s$.

In one non-limiting example, the reference frequency $f_{ref}$ corresponds to a frequency $f_D$ associated with the disturbance to the flow. For another example, the frequency $f_s$ is computed over time based on a number of response signals s. Example calculations for the flow rate u are described above with reference to Equations 3 and 4.

For the arrangement shown in FIG. 11, the disturbance is imparted passively. The flow conduit 12 may comprise a modified flow conduit 12, as indicated for example in FIG. 8. For the example arrangement shown in FIG. 8, the modified flow conduit 12 comprises a serpentine portion 9. As noted above, this serpentine arrangement is merely an illustrative example, and a variety of modified flow conduit configurations may be employed, provided they impart a disturbance to the flow. The flow conduit may also include a bypass portion, as indicated for example in FIG. 9. For this configuration, the sensor 14 may be located within or outside of the bypass portion 8.

Flow sensor assembly 50 may also be configured for bidirectional flow sensing. For these arrangements, flow conduit 12 and the sensor 14 are arranged in a symmetric configuration. The sensor 14 is configured to generate response signals in response to the disturbance in the flow from a first side 23 of the sensor, and the sensor is further configured to generate response signals in response to the disturbance in the flow from a second side 25 of the sensor to provide for bidirectional flow sensing.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A flow sensor assembly comprising:
a flow conduit configured to impart a disturbance to a flow;
a plurality of sensors disposed at respective ones of a plurality of sensing locations along the flow conduit, wherein each of said sensors is responsive to the disturbance of the flow and generates a corresponding response signal, wherein said flow conduit and said sensors are arranged in a symmetric configuration, wherein said sensors are configured to generate response signals in response to the disturbance in the flow from a first side of said sensors, and wherein said sensors are further configured to generate response signals in response to the disturbance in the flow from a second side of said sensors to provide for bidirectional flow sensing; and
a processor operably connected to each of said sensors, wherein said processor is configured to:
compute a cross-correlation function between the response signals generated by said sensors, and
determine a flow rate and a direction for the flow through said conduit based on the computed cross-correlation function.

2. The flow sensor assembly of claim 1, wherein neighboring ones of the sensing locations are separated by a distance less than a correlation length of the disturbance of the flow.

3. The flow sensor assembly of claim 1, wherein said flow conduit has one or more passive actuators configured to impart the disturbance to the flow and comprising MEMS actuators.

4. The flow sensor assembly of claim 1, wherein said flow conduit has one or more passive actuators configured to impart the disturbance to the flow and selected from the group consisting of protrusions extending into said flow conduit, blunt objects extending into said flow conduit, fixed apertures, mesh gratings, and combinations thereof.

5. The flow sensor assembly of claim 1, wherein said flow conduit comprises a modified flow conduit.

6. The flow sensor assembly of claim 5, wherein said modified flow conduit comprises a serpentine portion.

7. The flow sensor assembly of claim 1, wherein said flow conduit comprises a plurality of passive actuators, wherein at least one of said actuators is disposed on the first side of said sensors, wherein at least one of said passive actuators is disposed on the second side of said sensors, such that said actuators and sensors are arranged in a symmetric configuration to provide for bidirectional flow sensing.

8. The flow sensor assembly of claim 1, wherein said sensors comprise MEMS sensors.

9. The flow sensor assembly of claim 1, wherein at least one of said sensors is further configured to impart the disturbance to the flow.

10. The flow sensor assembly of claim 1, wherein said flow conduit comprises a bypass portion.

11. A flow sensor assembly comprising:
a flow conduit having one or more passive actuators configured to impart a disturbance to a flow;
a plurality of sensors disposed at respective ones of a plurality of sensing locations along the flow conduit, wherein each of said sensors is responsive to the disturbance of the flow and generates a corresponding response signal; and a processor operably connected to each of said sensors, wherein said processor is configured to:
compute a cross-correlation function between the response signals generated by said sensors, and
determine a flow rate and a direction for the flow through said conduit based on the computed cross-correlation function.

12. The flow sensor assembly of claim 11, wherein said flow conduit has one or more passive actuators configured to impart the disturbance to the flow, and wherein said sensors and said passive actuators are formed in a single monolithic element.

13. The flow sensor assembly of claim 11, wherein said sensors are formed in a single monolithic element.

14. The flow sensor assembly of claim 11, wherein at least one of said sensors and at least one of said passive actuators are formed in a single, monolithic element.

15. A flow sensor assembly comprising:
a flow conduit configured to guide a flow;
at least one active actuator disposed at a respective actuating location along the flow conduit, wherein said at least one active actuator is configured to impart a disturbance to the flow within said flow conduit;
a plurality of sensors disposed at respective ones of a plurality of sensing locations along the flow conduit, wherein each of said sensors is responsive to the disturbance of the flow and generates a corresponding response signal; and
a power supply for supplying power to said at least one active actuator; and
a processor operably connected to each of said sensors, wherein said processor is configured to:
compute a cross-correlation function between the response signals generated by said sensors, and
determine a flow rate and a direction for the flow through said conduit based on the computed cross-correlation function,
wherein said at least one actuator is not operably connected to said processor, and
wherein said power supply is not operably connected to said processor.

16. The flow sensor assembly of claim 15, comprising a plurality of active actuators, wherein at least one of said active actuators is disposed on a first side of said sensors, wherein at least one of said actuators is disposed on a second side of said sensors, such that said actuators and sensors are arranged in a symmetric configuration to provide for bidirectional flow sensing, wherein said sensors are configured to generate response signals in response to the disturbance in the flow from the first side, and wherein said sensors are further configured to generate response signals in response to the disturbance in the flow from the second side.

17. The flow sensor assembly of claim 16, wherein neighboring ones of the sensing locations are separated by a distance less than a correlation length of the turbulence of the flow.

18. The flow sensor assembly of claim 16, wherein said sensors comprise MEMS sensors.

19. The flow sensor assembly of claim 16, wherein said active actuators comprise MEMS actuators.

20. The flow sensor assembly of claim 16, wherein said sensors are formed in a single monolithic element.

21. The flow sensor assembly of claim 16, wherein said sensors and said active actuators are formed in a single monolithic element.

22. The flow sensor assembly of claim 16, wherein said flow conduit comprises a bypass portion.

* * * * *